United States Patent [19]

deMey, II

[11] Patent Number: 4,560,050
[45] Date of Patent: Dec. 24, 1985

[54] SLIP CLUTCH ASSEMBLY

[75] Inventor: Charles F. deMey, II, West Redding, Conn.

[73] Assignee: The Perkin-Elmer Corporation, Norwalk, Conn.

[21] Appl. No.: 517,090

[22] Filed: Jul. 25, 1983

[51] Int. Cl.$^4$ ............................................. F16D 13/08
[52] U.S. Cl. ................................ 192/81 C; 192/33 C; 192/56 C
[58] Field of Search ................. 192/33 C, 56 C, 81 C, 192/138, 148

[56] References Cited

U.S. PATENT DOCUMENTS

| 1,861,584 | 6/1932 | Readeker et al. | 192/81 C |
| 2,468,193 | 4/1949 | Goff | 192/56 C |
| 2,626,029 | 1/1953 | Gutterman | 192/81 C |
| 2,890,477 | 6/1959 | Miller | 192/81 C |
| 3,203,690 | 8/1965 | Werner | 268/124 |
| 3,335,835 | 8/1967 | Conlon | 192/56 C |
| 3,405,791 | 10/1968 | Kaplan | 192/81 |
| 3,893,554 | 7/1975 | Wason | 192/56 C |
| 4,372,432 | 2/1983 | Waine et al. | 192/33 C |

FOREIGN PATENT DOCUMENTS

| 48516 | 9/1981 | European Pat. Off. | 192/56 C |
| 60459 | 3/1982 | European Pat. Off. | 192/56 C |
| 693258 | 7/1940 | Fed. Rep. of Germany | 192/56 C |

Primary Examiner—Samuel Scott
Assistant Examiner—Noah Kamen
Attorney, Agent, or Firm—R. C. Wilder; F. L. Masselle; E. T. Grimes

[57] ABSTRACT

A slip clutch assembly includes a mandrel having a spring wound on a portion thereof. The spring effects torque transfer and, when further rotation is impaired, unwinds about the mandrel to prevent excessive torque transfer. Even after torque transfer is removed the driven element is securely positioned by the spring force.

1 Claim, 2 Drawing Figures

SLIP CLUTCH ASSEMBLY

BACKGROUND OF THE INVENTION

The present invention generally relates to a slip clutch assembly and, in particular, relates to such an assembly wherein the rotated element remains subjected to a torque after the motive force is removed.

In general, a slip clutch is used when the applied force, usually rotational in nature, is not to exceed a preselected torque or when the rotation imparted to a member being rotated is not to exceed a particular angular distance.

One particularly demanding application of mechanisms of this nature is in the operation and control of optical elements such as those used in analytical instruments. A specific application is the redirecting of a precisely aligned light beam either by interposing a mirror in the path of the beam or by rotating a mirror from one angular position in the beam to a second angular position in the beam. In such precisely aligned arrangements it is important to avoid mechanically shocking the optical elements as this could easily result in substantial misalignment thereof.

A conventional system usually includes an electric motor solenoids and/or pneumatic cylinders. However, such systems are difficult to modulate and control. Such systems also frequently respond too rapidly and consequently impart mechanical shocks to the elements. Another commonly used mechanism includes the use of a combination of springs and switches. The springs are positioned in the drive train of the motor to maintain the rotated member in position after the motive force is removed by means of the switches. To date these latter mechanisms have been mechanically complex, expensive and quite difficult to adjust.

In view of the above, what is clearly needed is a slip clutch assembly which is inexpensive, mechanically simplified and accurate.

SUMMARY OF THE INVENTION

Accordingly, it is one object of the present invention to provide a slip clutch assembly which fully meets the above-recited criteria.

This object is achieved, at least in part, by a slip clutch assembly including a spring positioned on a rotatable mandrel, a torque applied to the mandrel is coupled to a driven plate via the spring until a preselected level of torque is reached.

Other objects and advantages will become apparent to those skilled in the art from the following detailed description read in conjunction with the appended claims and the drawing attached hereto.

DETAILED DESCRIPTION OF THE INVENTION

Figure 1:
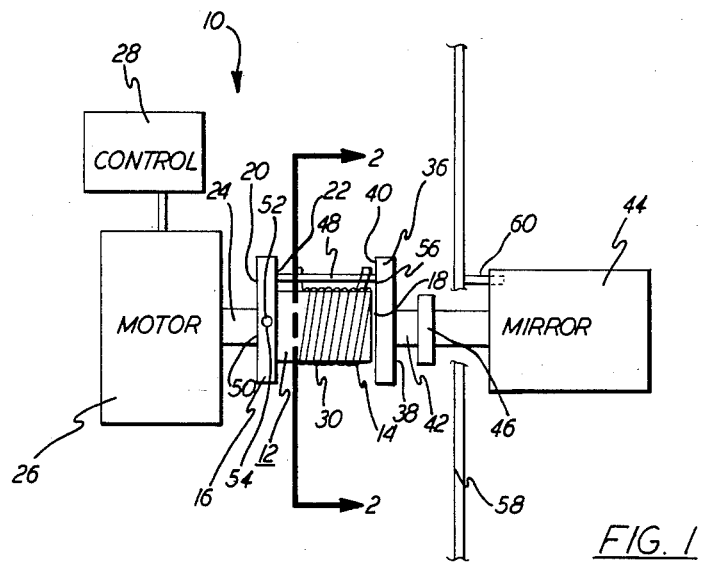
FIG. 1 is a side view of slip clutch assembly of this invention being used to control the orientation of a mirror.
Figure 2:
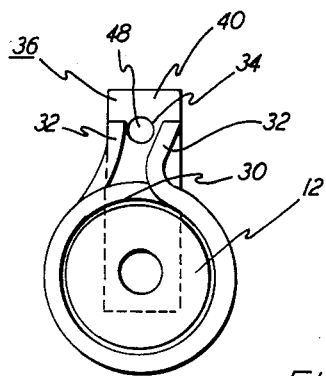
FIG. 2 is a cross sectional view of the slip clutch assembly in FIG. 1.

A slip clutch assembly, generally indicated at 10 in the drawing and embodying the principles of the present invention, includes a mandrel 12 having a first portion 14 having a comparatively smaller diameter and a second portion 16 having a comparatively larger diameter. Preferably, but not necessarily, the first portion 14 constitutes one end 18 of the mandrel 12 and the second portion 16 constitutes the other end 20 thereof, a single shoulder 22 being formed at the interface of the first and second portions, 14 and 16, respectively. The second portion 16 is adapted to receive a shaft 24, which shaft 24, in the preferred embodiment, is connected to a motor 26 which rotationally drives the shaft 24 and hence the mandrel 12. The motor 26, and the direction of rotation thereof is preferably dictated by a conventional motor control means 28.

A spring 30, having an internal diameter less than the diameter of the first portion 14 of the mandrel 12, is positioned thereon. The ends 32, or tangs, of the spring 30 are arranged such that, when the spring 30 is placed on the mandrel 12 and viewed longitudinally, a gap 34 is formed therebetween. That is, the respective ends 32 of the spring 30 are angularly offset and extend away from the mandrel 12.

The assembly 10 further includes a member 36 having a pair of substantially flat, parallel and opposing faces, 38 and 40. A shaft 42 is provided on one face 38 of the member 36 and extends axially therefrom. The shaft 42 is, in the preferred embodiment, connected to an optical element 44 to be rotated and of a length and diameter that an intermediate shaft support 46 is unnecessary. The opposing face 40 of the member 36 includes a rod 48 extending therefrom. The rod 48 is affixed eccentrically such that it extends away from the face 40 at least the length of the spring and through the gap 34 formed by the tangs 32 thereof.

In one preferred embodiment, a brass block is machined using conventional techniques, to form a mandrel 12 having a first portion 14 length of about 0.8 centimeter and a second portion 16 length about 0.01 centimeter. The diameter of the first portion 14 being about 1.9 centimeters and the second portion 16 diameter being about 2 centimeters. A blind hole 50 is drilled in the end 20 of the second portion 16 to accept the motor shaft 24. Preferably, although not necessarily, the shaft 24 includes a flat, not shown, at the end penetrating the blind hole 50. A radial hole 52 is drilled and threaded to accept, for example, a 6/32 Allen head screw 54 to secure the shaft 24 to the mandrel 12.

The spring 30 consists, in this embodiment, of about 6 turns of 1.1 centimeter diameter spring wire having an unstretched inside diameter of about 1.8 centimeters. The spring 30 is wound such that the tangs 32 extend about 0.6 centimeter from the outside diameter of the spring 30 and are arcuately spaced apart, for example, by about 0.3 centimeters.

In the preferred embodiment, the member 36 is an aluminum lever about 2.3 centimeters long of rectangular cross-section. The shaft 42 and the rod 48 are spaced apart by about 1.3 centimeters and extend away from the faces, 38 and 40 respectively. Preferably, the axes of the shaft 42 and the rod 48 are parallel openings to accept the shaft 42 and the rod 48 may be formed using known machining techniques.

Alternatively, the member 36 can be a plate formed from an aluminum disk and can either include the shaft 42 as an integral part thereof or be adapted to accept such a separate shaft therein. In this embodiment, the disk is about 3.2 centimeters in diameter and the integral shaft 42 is machined to about 0.6 centimeter in diameter and cut to a length of about 1 centimeter. An eccentrically positioned opening 56 of about 0.3 centimeter diameter is formed to accept the rod 48 therein. The opening 56 is axially offset by a radial length of about 1.3 centimeters and the rod 48 inserted therein. The rod 48 is of a length such that about 1 centimeter thereof protrudes from the face 40 of the member 36. The diameter of the rod 48, in this example, about 0.3 centimeter, is chosen so that it longitudinally extends through the tangs 32 of the spring 30.

In one mode of operation the assembly 10 is mounted such that the driven shaft 42 extends through a baseplate 58 of an analytical instrument and connects to a beam-directing mirror 44 on the other side. The extent of rotation of the mirror 44 is controlled by stops 60, only one of which is shown. The stops 60 are positioned such that when the mirror 44 is driven against them a light beam is directed to two different paths.

In operation, the motor 26 is activated whereupon the mandrel 12 is rotationally driven by the motor shaft 24. Since the spring 30 is unextended, and tight about the mandrel 12, rotational force is transferred to the rod 48. Consequently, the inertia and friction of the member 36 and mirror 44 is overcome and the mirror 44 is rotated from a first position to a second position. When the mirror 44 reaches the second position the mechanical stops 60 is encountered. Although the motor control 28 is designed to shut the motor 26 off after, or about, this amount of rotation occurs, the motor 26 nevertheless continues to rotate under its own inertia. Consequently, even if the motor 26 is not shut off, for whatever reason, the mechanism is undamaged.

Once the stop 60 is encountered by the mirror 44 however, the rod 48 becomes fixed with respect to the spring 30. Thus, any further motor rotation causes the spring 30 to begin to unwind about the mandrel 12. The spring 30 will continue to unwind against the rod 48 until its inside diameter becomes larger than the outside diameter of the first portion 14 of the mandrel 12. At that point, the mandrel 12 rotates freely within the spring 30 until the motor 26 completely stops. Nevertheless, the spring 30 continues to exert a torque on the rod 48 and, by continuously trying to rewind, thus securely positions the mirror 44 against the stops 60, i.e., in its precise optical position.

The slip clutch assembly 10 described above is reversible. That is, the shaft 42 could be connected to the motor 26 and the shaft 24 connected to the driven optical element 44.

An additional advantage of the slip clutch assembly 10 is that it provides a flexible coupling between the motor 26 and the element 44 and thereby accommodates alignment tolerance therebetween.

Although the present invention has been described herein with respect to a specific embodiment, other arrangements and configurations will become apparent to those skilled in the art upon reading this specification. This description is considered exemplary in nature and not as limiting, hence the present invention is deemed limited only by the appended claims and the reasonable interpretation thereof.

What is claimed is:

1. A bidirectional torque transmitting and limiting apparatus for use in analytical instruments, in combination comprising:
    a mandrel rotatable about its axis in a first direction and in a second opposite direction;
    motor means fixedly attached to said mandrel for rotating said mandrel selectively in the first direction or in the second direction;
    a driven member substantially coaxially disposed in axially spaced relationship with respect to said mandrel, said driven member having an axially extending protuberance disposed radially outwardly of said mandrel;
    first rotation limiting means for limiting the rotational movement of said driven member in the first of its two directions of rotation about its axis;
    second rotation limiting means for limiting the rotational movement of said driven member in the second of its two directions of rotation about its axis;
    a helical spring mounted on said mandrel, the inner diameter of said spring when in its unstretched mode being less than the outer diameter of said mandrel for engagement therewith and the inner diameter of said spring being greater than the outer diameter of said mandrel when in its stretched mode for disengagement therewith, the axial length of said mandrel being at least as long as the axial length of said spring;
    said spring having a radially extending tang at each end thereof, one of said tangs being offset circumferentially with respect to the other of said tangs so that rotation of said mandrel in one direction causes one tang to engage one side of said protuberance and rotation of said mandrel in the opposite direction causes the other of said tangs to engage the other side of said protuberance, whereby rotation of said mandrel in its first direction or in its second direction causes said driven member to rotate until said first rotation limiting means or said second rotation limiting means, respectively, is encountered whereupon continued rotation of said mandrel a preselected distance stretches said helical spring to allow said mandrel to rotate with respect to said spring; and
    said mandrel applying a constant, preselected torque to said driven member while said mandrel rotates with respect to said spring whereby engagement of said driven member with said first rotation limiting means or said second rotation limiting means is maintained.

* * * * *